(12) United States Patent  (10) Patent No.: US 7,719,130 B2
Hirose et al.  (45) Date of Patent: May 18, 2010

(54) POWER CABLE LINE

(75) Inventors: Masayuki Hirose, Osaka (JP); Ryosuke Hata, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 238 days.

(21) Appl. No.: 11/791,946

(22) PCT Filed: Oct. 31, 2005

(86) PCT No.: PCT/JP2005/020017

§ 371 (c)(1),
(2), (4) Date: May 31, 2007

(87) PCT Pub. No.: WO2006/059445

PCT Pub. Date: Jun. 8, 2006

(65) Prior Publication Data

US 2008/0217995 A1    Sep. 11, 2008

(30) Foreign Application Priority Data

Dec. 1, 2004  (JP) .............................. 2004-349164

(51) Int. Cl.
*H04B 3/54* (2006.01)
*H01B 12/00* (2006.01)

(52) U.S. Cl. .................. 307/1; 307/2; 307/4; 174/74 R; 174/75 C; 174/78; 174/88 C; 174/90; 174/128.1; 174/128.2; 505/230; 505/235; 505/238

(58) Field of Classification Search .................. 307/1–2, 307/4; 505/230, 235, 238; 174/74 R, 75 C, 174/78, 88 C, 90, 128.1, 128.2

See application file for complete search history.

(56) References Cited

U.S. PATENT DOCUMENTS 4,516,198 A * 5/1985 Liss .............................. 363/35

(Continued)

FOREIGN PATENT DOCUMENTS

CN    1489769 A    4/2004

(Continued)

OTHER PUBLICATIONS

Russian Decision on Grant mailed Feb. 13, 2009, including translation (10 pgs.).

(Continued)

*Primary Examiner*—Albert W Paladini
*Assistant Examiner*—Hal I Kaplan
(74) *Attorney, Agent, or Firm*—Foley & Lardner LLP

(57) ABSTRACT

In a DC power transmission and distribution line, a power cable line for making it possible to easily supply power to various electric power machines used for operation of the line is provided.

A power cable line includes a power cable (1g, 1r, 1p, 1m, 1n) for executing DC transmission and distribution, an AC superposing section 2 for superposing an AC component on the power cable, and a branch power supply section 3 for taking out power induced by the superposed AC component from the cable. The AC component is superposed on the power cable by the AC superposing section 2 and AC power together with DC power is transmitted to the power cable. The superposed AC component is taken out by the branch power supply section 3 provided in a midway point of the cable and is supplied to various electric power machines.

14 Claims, 11 Drawing Sheets

U.S. PATENT DOCUMENTS

| | | | |
|---|---|---|---|
| 4,943,902 A * | 7/1990 | Severinsky | 363/80 |
| 5,953,224 A * | 9/1999 | Gold et al. | 363/98 |
| 6,399,878 B2 * | 6/2002 | Kondo et al. | 174/25 R |
| 7,238,887 B2 * | 7/2007 | Hirose | 174/125.1 |
| 7,358,435 B2 * | 4/2008 | Ladie' et al. | 174/15.4 |
| 7,576,447 B2 * | 8/2009 | Biester et al. | 307/12 |
| 2004/0058822 A1 | 3/2004 | Ohmatsu | |

FOREIGN PATENT DOCUMENTS

| | | |
|---|---|---|
| JP | 58-127527 | 7/1983 |
| JP | 1-140514 | 6/1989 |
| JP | 2003-249130 | 9/2003 |
| RU | 2 028 638 C1 | 2/1995 |
| SU | 1132263 A | 12/1984 |

OTHER PUBLICATIONS

Chinese Office Action dated Apr. 10, 2009 with the English translation.

* cited by examiner

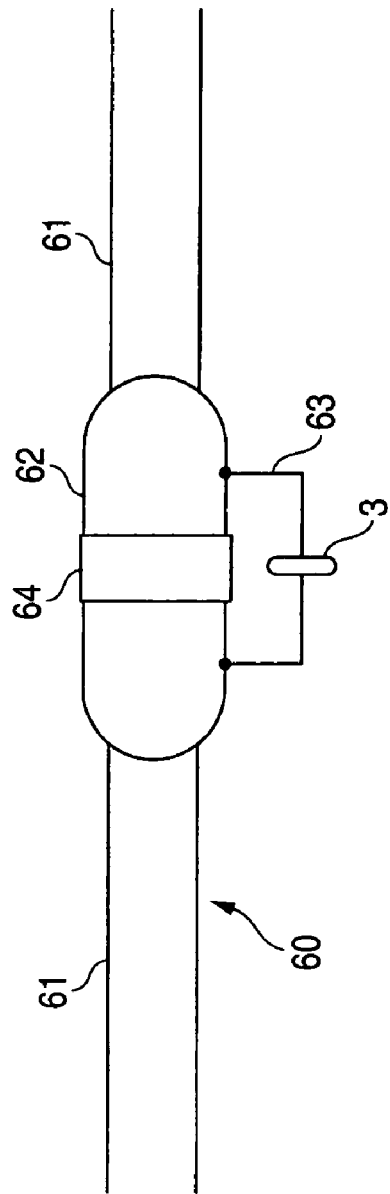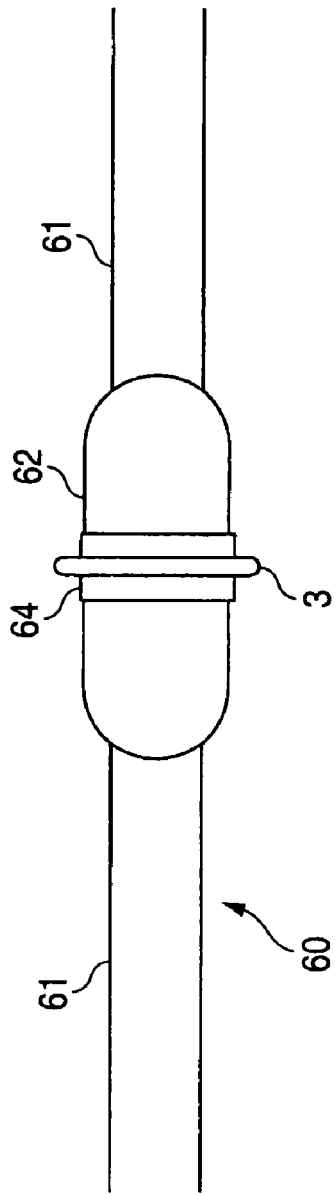
FIG. 10A
FIG. 10B

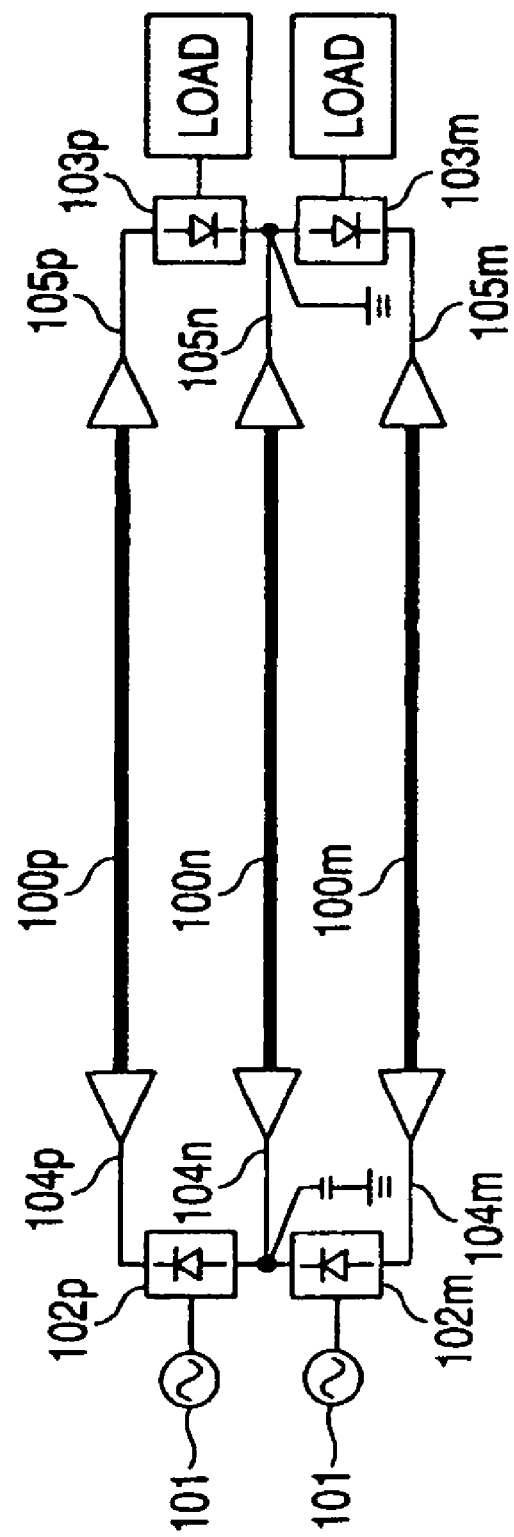
FIG. 11 (B) --Prior Art--

POWER CABLE LINE

TECHNICAL FIELD

This invention relates to a power cable line for executing DC power transmission. It relates in particular to a power cable line for making it possible to draw out branch power to be supplied to various electric power machines provided on the line and used for operation of the line.

BACKGROUND ART

Hitherto, not only AC power transmission, but also DC power transmission has been executed as electric power supply. The DC power transmission does not involve problems occurring in AC power transmission, such as an AC loss of a dielectric loss, a conductor loss caused by the skin effect, etc., and a large current flowing at the accident time of a short circuit, etc., for example, and large-capacity power can be transmitted. There are two systems of monopolar power transmission (monopole power transmission) and bipolar power transmission (bipole power transmission) for the DC power transmission.

In the monopolar power transmission, a power cable $100g$ as a going line and a power cable $100r$ as a return line are connected by leads 104 and 105 through DC/AC converters 102 and 103, forming a closed circuit, as shown in FIG. 11 (A). An AC system of an AC power supply 101 and a load using transmitted power is connected to the converters 102 and 103. In the bipolar power transmission, a power cable $100p$ as a positive pole line, a power cable $100m$ as a negative pole line, and a power cable $100n$ as a neutral line are provided in parallel and are connected by leads $104p$, $104m$, $104n$, $105p$, $105m$, and $105n$ through DC/AC converters $102p$, $102m$, $103p$, and $103m$, forming a closed circuit, as shown in FIG. 11 (B). An AC system of AC power supplies 101 and loads is connected to the converters $102p$, $102m$, $103p$, and $103m$.

The power cable used with such DC power transmission generally is a solid cable or an oil-immersed paper cable of an OF cable, etc. In addition to the normal conducting cable mentioned above, a superconducting cable for DC power transmission is proposed (for example, patent document 1).

On the other hand, to operate a power cable line, electric power machines such as various sensors and a monitoring device are used. With the superconducting cable, in addition to them, machines such as an auxiliary refrigerator, an auxiliary pump, and an auxiliary vacuum pump are also used.

Patent document 1: JP-A-2003-249130

DISCLOSURE OF THE INVENTION

Problems to be Solved by the Invention

A system independent of electric power transmitted to a power cable is introduced or a battery, a generator, etc., is additionally installed at each place of a culvert, a manhole, etc., and they are used as independent power supplies because they can be provided with safety and easily as the power supplies for driving the above-mentioned electric power machines. However, when power from the independent power supplies is lost due to an accident, etc., if a monitor-impossible state, etc., is entered, stable operation cannot be accomplished; this is a problem. Particularly, with a superconducting cable line, if the power source of a machine required for cooling a refrigerant used to maintain the superconducting state is lost, there is a fear of incurring the situation of power transmission stop. To avoid the situations, additional measures are demanded.

It is therefore an advantage of the invention to provide a power cable line for enabling branch power to be easily drawn out particularly in DC power transmission.

Means for Solving the Problems

According to an embodiment of the invention, on a cable line for executing DC power transmission, an AC component for branch power is superposed on the cable and the AC component is also transmitted together with the DC power. That is, a power cable line includes a power cable for executing DC transmission and distribution, an AC superposing section for superposing an AC component on the power cable and a branch power supply section for taking out power induced by the superposed AC component from the cable.

In an AC power transmission line, the above-mentioned electronic power machines can be driven using transmission power of a power cable. Specifically, branch power can be taken out by using induced coupling. However, the method cannot be used in DC power transmission because an induced current cannot occur. Then, in the invention, also in DC power transmission, an AC component required for branch power is transmitted together with DC power to take out branch power by induced coupling as in AC power transmission. Power inducted from the AC component is taken out in the branch power supply section and is used as a power source of various electric power machines used for operation of the line. According to the configuration, the line of the invention eliminates the need for introducing an additional system and the need for providing independent power sources of a battery, a generator, etc., at each place, and trouble caused by power loss from the independent power sources can be avoided and stable DC transmission and distribution can be conducted.

A normal conducting cable or a superconducting cable can be used as the power cable included in the line of the invention. Oil impregnated paper cables of an oil impregnated paper solid cable, a GF cable, an OF cable, etc., can be used as the normal conducting cable. A known normal conducting cable may be used. The solid cable has the advantages that it has a simple structure, is suited to a long distance, and does not require refueling facilities. The OF cable has the advantages that it is free of the oil leak phenomena as with the solid cable and the OF cable is particularly excellent in electric characteristics. The GF cable has the advantage that it does not involve a transient oil pressure problem as with the OF cable. A representative configuration of the normal conducting cables includes a cable core having a conductor and an electric insulating layer placed in the outer periphery of the conductor and a metal sheath placed in the outer periphery of the cable core. A single-core cable having one cable core may be used or a multicore cable having a plurality of cores may be used.

Although the above-mentioned normal conducting cable may be used, a superconducting cable is more preferable because it has low resistance and a larger transmission power can be taken out as compared with the normal conducting cable. A representative superconducting cable has a structure wherein one or multiple cable cores are housed in a heat insulation tube and are cooled by a refrigerant of liquid nitrogen, etc., filled into the tube. The superconducting cable of a low temperature insulting type and the superconducting cable of a normal temperature insulting type can be used. For example, with the low temperature insulting type, the cable core can be made up of a former, a first superconducting layer, an electric insulating layer, and a second superconducting layer in order from the center. For the core including the first superconducting layer and the second superconducting layer, for example, the first superconducting layer may be used as a layer for allowing a going current to flow and the second superconducting layer may be used as a layer for allowing a return current to flow. The cable core may be a cable core having no second superconducting layer. That is, the core includes only one layer as a superconducting layer. A ground shield layer as a ground potential is included in the cable core having no second superconducting layer. For the core having no second superconducting layer, using a plurality of cores, for example, the superconducting layer of one core may be used as a layer for allowing a going current to flow and the superconducting layer of another core may be used as a layer for allowing a return current to flow. In the normal temperature insulting type, the cable core can be made up of a former, a first superconducting layer, a heat insulation tube, an electric insulating layer, and a shield layer in order from the center. For the core, using a plurality of cores as with the core having no second superconducting layer described above, for example, the superconducting layer of one core may be used as a layer for allowing a going current to flow and the superconducting layer of another core may be used as a layer for allowing a return current to flow. As the heat insulation tube, generally, a heat insulation tube of a double-tube structure having a vacuum layer between an inner tube and an outer tube is used. As the superconducting cable, like the normal conducting cable, a single-core cable having one cable core described above may be used or a multicore cable having a plurality of cores may be used.

The line of the invention may be used for monopolar power transmission or bipolar power transmission. For monopolar power transmission, a going line and a return line are provided and for the bipolar power transmission, a positive line, a negative line, and a neutral line are provided. According to an alternative embodiment of the present invention a superconducting cable can be used with a single-core cable or a multicore cable. Table 1 below lists specific line examples using superconducting cables. To execute monopolar power transmission or bipolar power transmission using superconducting cables, if a cable including a cable core having a first superconducting layer and a second superconducting layer coaxially through an electric insulating layer as listed in Table 1 is used, a line can be constructed with a minimum number of cores. For example, in the monopolar power transmission, a single-core cable including one cable core listed in Table 1 may be used. Alternatively, as a multicore cable including a plurality of cores listed in Table 1, lines may be constructed in a one-to-one correspondence with cores and a plurality of lines may be constructed with one strand of a cable or a line may be constructed with one core and the remaining core may be used as a spare line. In the bipolar power transmission, two strands of single-core cables each including one cable core listed in Table 1 may be used. If, however, a multicore cable including two cores as listed in Table 1 is used, the number of cable strands can be more lessened. A three-core cable including three cores may be used and one core may be used as a spare line.

TABLE 1

| Monopolar power transmission | Bipolar power transmission |
|---|---|
| Cable core 1<br>First superconducting layer<br>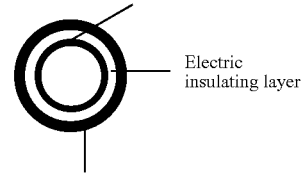 | Cable core 1<br> |
| Second superconducting layer<br>First superconducting layer:<br>Going line<br>Second superconducting layer:<br>Return line | First superconducting layer:<br>Positive line<br>Second superconducting layer:<br>Neutral line<br>Cable core 2<br><br>First superconducting layer:<br>Negative line<br>Second superconducting layer:<br>Neutral line |

To construct a monopolar power transmission line using cable cores having no second superconducting layer, two cores may be used. The first superconducting layer of one core may be used as a going line and the first superconducting layer of another core may be used as a return line. At this time, the cable may be a single-core cable with two cores housed in separate heat insulation tubes or may be a multicore cable with two cores housed in a single heat insulation tube. To construct a bipolar power transmission line using cable cores having no second superconducting layer, three cores may be used. The first superconducting layer of one core may be used as a positive line, the first superconducting layer of another core may be used as a negative line, and the first superconducting layer of the remaining core may be used as a neutral line. At this time, the cable may be a single-core cable with three cores housed in separate heat insulation tubes or may be a multicore cable with three cores housed in a single heat insulation tube. The core having no second superconducting layer is provided with a ground shield layer as a ground potential.

In each of the lines described above, AC may be superposed on the first superconducting layer or the second superconducting layer if a cable core having a second superconducting layer is used. If a cable core having no second superconducting layer is used, AC is superposed on the first superconducting layer.

To use a normal conducting cable, usually a conductive layer corresponding to a second superconducting layer is not included. Then, a layer corresponding to a second superconducting layer is provided. Specifically, an electrode layer may be provided coaxially with a conductor using a conductive material of copper, etc., in the outer periphery of an electric insulating layer or a cable (core) having a conductor for allowing a return current to flow and a cable (core) having a conductor for allowing a going current to flow may be provided separately as with the superconducting cable having no second conducting layer. In the former, AC may be superposed on the conductor or the electrode layer. In the latter, AC is superposed on the conductor.

As a more specific line configuration of monopolar power transmission, a power cable (or a cable core, which is similarly applied in this paragraph) as a going line and a power cable as a return line are connected by a lead through an AC/DC converter and a DC/AC converter to form a closed circuit. An AC power supply is connected to one end of the cable as the going line, a load is connected to an opposite end of the cable, and one end of the cable as the return line is grounded. This configuration enables the load to use power transmitted as DC from the AC power supply. As a more specific line configuration of bipolar power transmission, a power cable as a positive line, a power cable as a negative line, and a power cable as a neutral line are connected in parallel by a lead through an AC/DC converter and a DC/AC converter to form a closed circuit. An AC power supply is connected to one end of the cable as the positive line and a load is connected to an opposite end of the cable. An AC power supply is connected to one end of the cable as the negative line and a load is connected to an opposite end of the cable. One end of the cable as the neutral line is grounded. This configuration enables the load to use power transmitted as DC from the AC power supply.

According to an embodiment of the present invention, the AC superposing section for superposing an AC component on the line and the branch power supply section for taking out power induced by the AC component are included. As the placement part of the AC superposing section, for example, a part where DC current is applied to the line, specifically the proximity of an AC/DC converter to which an AC power supply is connected can be used. AC power to be superposed is set to any desired power amount required for driving an electric power machine and excessive AC power is not superposed so that DC power transmission is not impaired. That is, the AC power to be superposed is set sufficiently small relative to the DC current transmitted to a load. AC can be superposed on a first superconducting layer or a second superconducting layer if the cable is a superconducting cable. AC can be superposed on a conductor or an electrode layer provided in the outer periphery of an electric insulating layer if the cable is a normal conducting cable. As a specific configuration of the AC superposing section, for example, a configuration including a transformation section (trans section) connected to an AC power supply and capable of changing an AC component to any desired size can be used. In this configuration, the transformation section can adjust an AC component to any desired power. In addition, as for the AC superposing section, an AC superposing section for superposing an AC component by induced coupling can be used. Specifically, a configuration including a magnetic substance placed on the outer periphery of a cable core (or a lead connecting cores) included in a power cable and a winding connected to an AC power supply, into which AC current is allowed to flow, the winding wound around the magnetic substance can be used. In this configuration, current from the AC power supply flows into the winding, whereby a magnetic field is applied to the magnetic substance and current flows into the cable core (or the core through the lead) in response to the magnetic permeability of the magnetic field and the magnetic substance. The configuration is more advantageous for conducting DC power transmission of large current more than the configuration including the transformation section described above. As the magnetic substance, preferably, particularly a substance made of a ferromagnetic body having high magnetic permeability, for example, a ferrite core is used. As the magnetic substance, a substance shaped like a ring using a plurality of split pieces in combination so as to be easily placed on the outer periphery of the cable core or the lead is suited. The winding is formed of a material having electric conductivity. A known inductive coupler may be used.

Preferably, the branch power supply section has a configuration using induced coupling because branch power can be easily taken out. Specifically, a configuration including a magnetic substance placed in a separation part described later or the outer periphery of a portion where no return current flows in a second superconducting layer and a winding wound around the outer periphery of the magnetic substance and connected to various electric power machines where AC current flows can be used. In this configuration, a magnetic field is applied to the magnetic substance by the AC component superposed on the power cable and AC current flows into the winding in response to the magnetic permeability of the magnetic field and the magnetic substance, making it possible to supply power to various electric power machines. As the magnetic substance, preferably, particularly a substance made of a ferromagnetic body having high magnetic permeability, for example, a ferrite core is used. As the magnetic substance, a substance shaped like a ring using a plurality of split pieces in combination so as to be easily placed in the outer periphery of the power cable is suited. The winding is formed of a material having electric conductivity.

To use a cable including a layer where a going current flows (which will be hereinafter referred to as going layer) and a cable including a layer where a return current flows (which will be hereinafter referred to as return layer) coaxially as a DC power cable, a current in an opposite direction to the going current flows into the return layer and therefore a magnetic field produced by the return current cancels a magnetic field produced by the going current and a leak magnetic field to the outside of the cable is almost zeroed. For example, in a superconducting cable including a first superconducting layer and a second superconducting layer coaxially, to use the first superconducting layer as a going layer and the second superconducting layer as a return layer, the second superconducting layer functions as a shield. Thus, in the portion where the return layer is included, it is impossible to take out power by induced coupling. Therefore, in the cable including the going layer and the return layer coaxially, preferably the above-mentioned branch power supply section is placed in a separation part where the going layer and the return layer are not coaxial. As a portion where the separation part is provided, an interconnection section for connecting cables and a termination connection section for connecting the cable and an external machine can be used. In the power cable line, usually the layers of a shield layer (return layer), an electric insulating layer, etc., making up the cable are step-stripped and are subjected to connection treatment in the connection section and thus a part where the outside of the going layer is not covered with the return layer, namely, a separation part where the going layer and the return layer are disposed non-coaxially is formed. In this separation part, the magnetic field produced by the current flowing into the going layer and the magnetic field produced by the current flowing into the return layer do not cancel each other and thus either of the magnetic fields can be used to branch and taken out power from the connection section by induced coupling.

According to another embodiment of the present invention, two cable cores each including a first superconducting layer and a second superconducting layer coaxially with the first superconducting layers of the cores used as positive and negative lines and the second superconducting layers of the cores used as neutral lines for executing bipolar power transmission are provided. Apparently a DC current does not flow into the second superconducting layers of the cores. Therefore, a branch power supply section may be able to be provided even in a part where the first superconducting layer and the second superconducting layer are placed coaxially.

Using a superconducting cable having no second conducting layer, a branch power supply section may be provided in any desired part of the cable.

Using a cable having an electrode layer as a return layer in a normal conducting cable, a branch power supply section may be provided in an interconnection section or a termination connection section in a similar manner to that described above. Using two cable cores each including a conductor and an electrode layer coaxially and using the conductors of the cores as positive and negative lines and the electrode layers of the cores as neutral lines for executing bipolar power transmission, a branch power supply section may be able to be provided even in a part where the conductor and the electrode layer are placed coaxially in a similar manner to that described above. Using a normal conducting cable having no electrode layer as a return layer, a branch power supply section may be provided in any desired part of the cable.

Particularly, as a representative configuration of the interconnection section of the superconducting cables, the following configuration is provided. In the description, superconducting cables each including a second superconducting layer are taken as an example. The cores included in the two cables to be connected are abutted against each other, the second superconducting layer in each core is partially stripped to expose an electrical insulating layer and a first superconducting layer. The exposed first superconducting layers are connected to each other, and an insulating coat section is formed in the surrounding of the connection part. The second superconducting layers provided on the electric insulating layers in the cable cores, included in the abutted cores or the adjacent cores are connected to each other. The insulating coat section and the second superconducting layer connection section are surrounded by a refrigerant tank and are immersed in a refrigerant. The surrounding of the refrigerant tank is covered with a vacuum tank and the space between the refrigerant tank and the vacuum tank is evacuated to form an interconnection section.

As a representative configuration of the termination connection section of the superconducting cable, the following configuration is used. A termination connection box having a refrigerant tank covered with a vacuum tank is provided, the end of a superconducting cable along the horizontal direction is introduced into the refrigerant tank, with one end of a lead rod along the vertical direction being introduced into the refrigerant tank. An opposite end of the lead rod is drawn out to the outside of the vacuum tank, and one end of the lead rod and the end of the superconducting cable are connected directly or indirectly in the refrigerant tank. The lead rod can be made up of a conductor part made of copper, aluminum, etc., and an insulating bushing of FRP, etc., covering the outside of the conductor part, for example.

For the interconnection section of superconducting cables and the termination connection section described above, the refrigerant tank or the vacuum tank may be branched for each core if a multicore cable is used. For example, for the superconducting cable having three cores, it is possible to branch only the refrigerant tank and house the three cores in the vacuum tank collectively. That is, a plurality of cores are stored in the connection section, the refrigerant tank is provided with refrigerant branch sections each for each core for housing separation parts, and the vacuum tank covers all the refrigerant branch sections collectively. At this time, a branch power supply section is formed in the separation part of the refrigerant branch section.

In addition, for a multicore superconducting cable, both the refrigerant tank and the vacuum tank may be branched. That is, a plurality of cores are stored in the connection section, the refrigerant tank is provided with refrigerant branch sections each for each core for housing separation parts, and the vacuum tank is provided with vacuum branch sections for covering the refrigerant branch sections. At this time, a branch power supply section is formed in the separation part of the vacuum branch section.

On the other hand, for a line of a plurality of single-core superconducting cables each having a second superconducting layer, arranged in parallel, preferably, discrete connection sections formed in a one-to-one correspondence with the single-core cables are arranged in parallel and branch power is drawn out from a connection section joining the parallel discrete connection sections. That is, the connection section has a short circuit section for short-circuiting the second superconducting layers of the cables between the adjacent discrete connection sections formed in a one-to-one correspondence with the single-core superconducting cables. The short circuit section becomes a separation part where the first superconducting layer and the second superconducting layer are not placed coaxially. At this time, a branch power supply section can be provided in the short circuit section.

To use a superconducting cable as a power cable as described above, a branch power supply section may be provided in at least one part of the inside of the refrigerant tank, the inside of the vacuum tank outside the refrigerant tank, and the outside of the vacuum tank. At this time, usually, in the core of a superconducting cable including a second superconducting layer, the part where the second superconducting layer is stripped contains an electric insulating layer and has a large diameter, but the part separated from the core and containing only the second superconducting layer has a small diameter. Therefore, preferably, a branch power supply section is provided in the part containing only the second superconducting layer. Thus, for the line using a superconducting cable including a second superconducting layer, the following parts in the connection section can be used as specific examples of a separation part where a branch power supply section is provided:

(1) Part where first superconducting layer is not covered with the second superconducting layer in the core;

(2) if the cable includes a plurality of cores, a short circuit section short-circuiting the second superconducting layers of different cores (for example, positive and negative cores) in a state in which the first superconducting layers are connected in the proximity of the connection part of the first superconducting layers of the cores; and (3) connection part connecting the second superconducting layers of both cores in parallel with the connection part of the first superconducting layers by abutting a pair of cores.

For a monopolar power transmission line, a branch power supply section may be provided either only in a going line, only in a return line, or in both the going line and the return line. For a bipolar power transmission line, a branch power supply section may be provided in at least one line of a positive line, a negative line, and a neutral line. For example, it may be provided either only in the positive line, in the positive line and the negative line, in all lines of the positive line, the negative line, and the neutral line.

The above-described branch power supply section is provided, whereby an induced current is generated by the magnetic field of AC superposed on the cable and the current can be drawn out to the outside of the connection section through an additional lead wire attached to the branch power supply section. When the branch power supply section is disposed in the refrigerant tank, the lead wire passes through the refrigerant tank and the vacuum tank and is drawn out to the outside of the connection section. When the branch power supply section is disposed inside the vacuum tank outside the refrigerant tank, the lead wire passes through the vacuum tank and is drawn out to the outside of the connection section. At this time, preferably the passage part of the lead wire in the refrigerant tank or the vacuum tank is sealed with a hermetic seal, etc.

The above-described branch power supply section is connected through the lead wire to various electric power machines used for operation of the power cable and power taken out in the branch power supply section is supplied to the electric power machine. As the electric power machines, various sensors and a monitoring device can be included. In addition, if the cable is a superconducting cable, an auxiliary refrigerator, an auxiliary pump, an auxiliary vacuum pump, etc., can be used.

As an AC component is extracted by the above-described branch power supply section, the superposed AC component is scarcely transmitted to a load. However, a filter may be provided for reliably decreasing flowing of the AC component into the load. Such a filter is placed in the proximity of the load using the transmitted DC power. As the placement part of the filter, for example, the proximity of the part where AC current into which DC current is converted is applied to the line, specifically the load side after conversion to AC by a DC/AC converter can be used. The filter may be incorporated in the DC/AC converter. As the filter, a filter for attenuating the superposed AC component and allowing DC current to pass through may be used.

The power cable line of the invention including the described configuration can produce the advantage that power can be easily supplied to various electric power machines used for operation of the line by superposing an AC component while executing DC power transmission. Particularly, to use a superconducting cable as a power cable, large-capacity DC power transmission can be conducted as compared with a normal conducting cable.

BRIEF DESCRIPTION OF THE DRAWINGS

FIGS. 10(A) and 10(B) are schematic drawings to show the schematic configuration including a branch power supply section in an interconnection section of normal conducting cables with FIG. 10(A) showing an example including a branch power supply section on the outer periphery of a connection line and FIG. 10(B) showing an example including a branch power supply section on the outer periphery of a joint section of a connection case.

Figure 1:
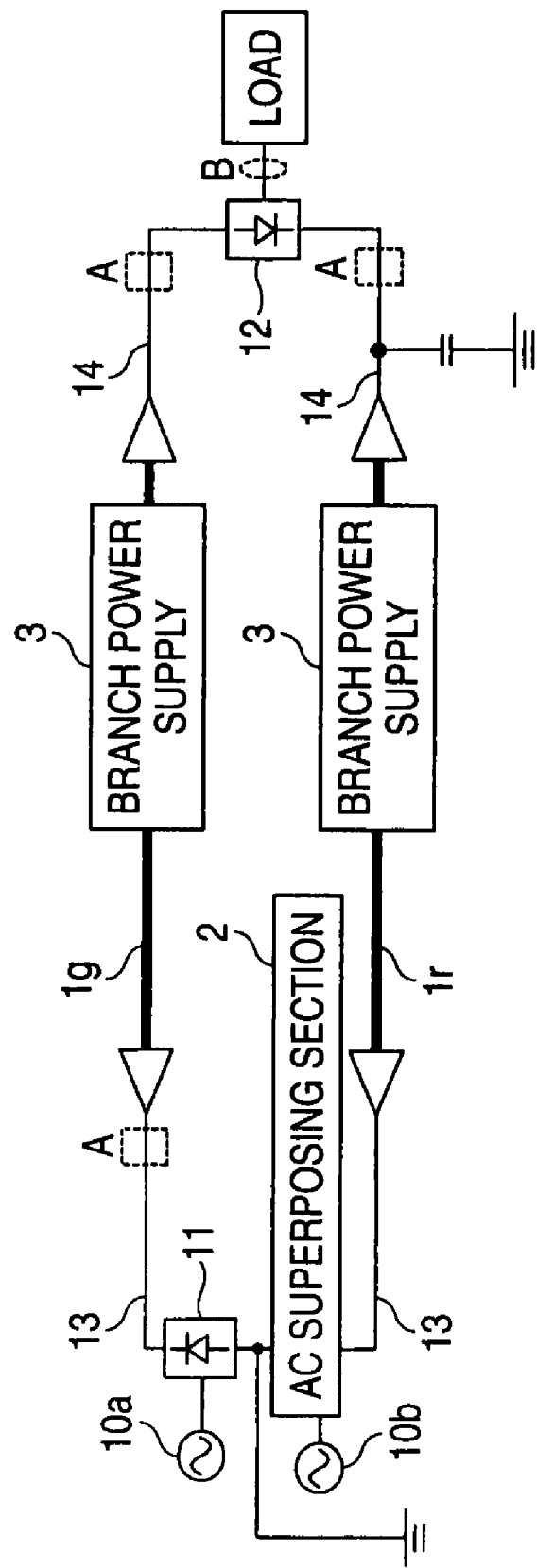
FIGS. 1(A) and 1(B) are schematic configuration drawings of a power cable line of the invention with FIG. 1(A) showing a monopolar power transmission line and FIG. 1(B) showing a bipolar power transmission line.
Figure 1:
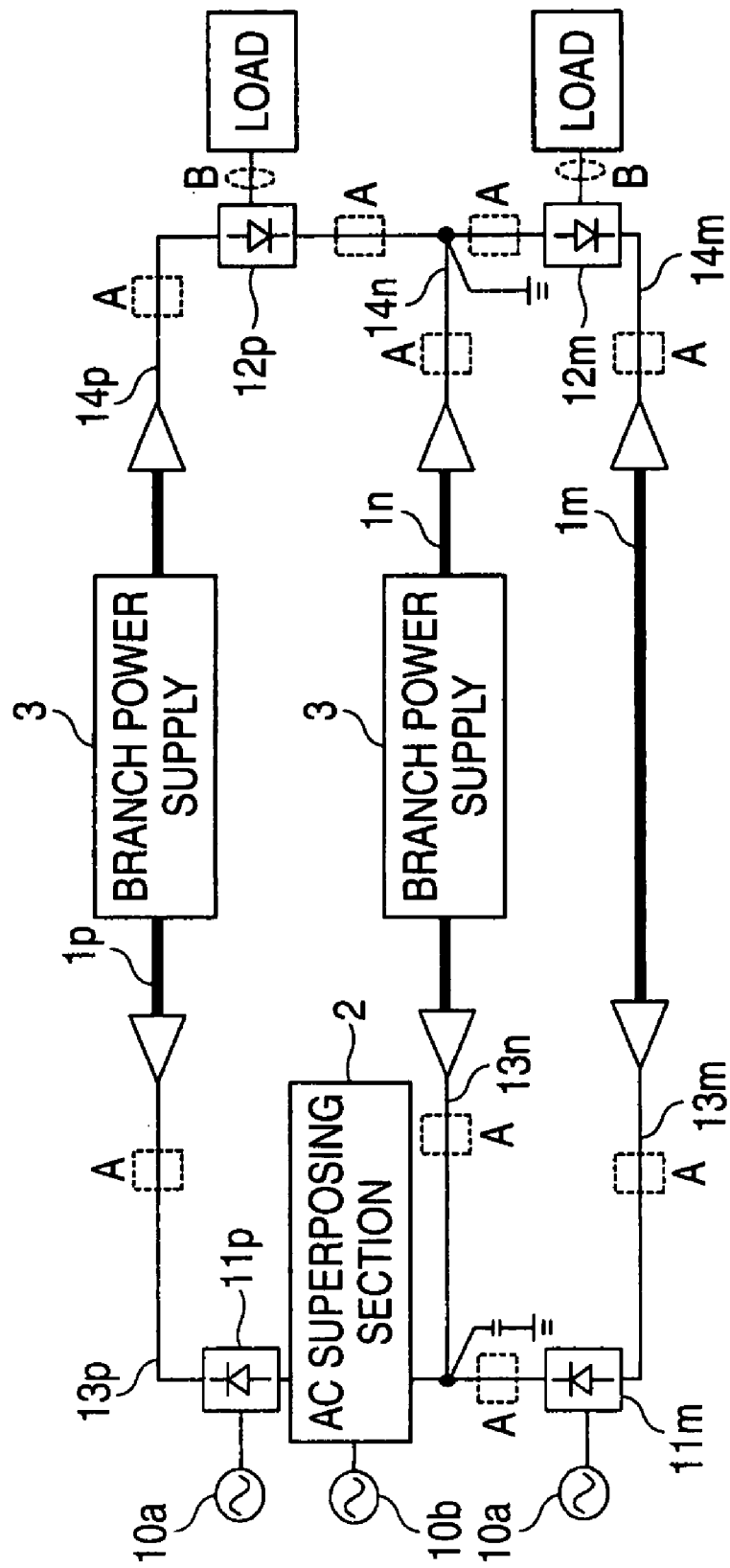

DESCRIPTION OF REFERENCE NUMERALS 1g, 1r, 1p, 1m, in Power cable 2, 2A, 2B AC superposing section 2a Ferromagnetic body 2b Winding 3 Branch power supply section
10a, 10b AC power supply 11 AC/DC converter 11p First AC/DC converter
11m Second AC/DC converter 12 DC/AC converter
12p First DC/AC converter 12m Second DC/AC converter
13, 13p, 13m, 13n, 14, 14p, 14m, 14n Lead
15 Former 20 First superconducting layer 30 Electrical insulating layer 40 Second superconducting layer
50 Protective layer
31 Insulating coat section 41 Short circuit section 41a Short circuit connection section 42 Coupling section
60 Normal conducting cable 61 Sheath 62 Connection case 63 Connection line 64 Joint section
100 Superconducting cable 110 Cable core 120 Heat insulation tube
121 Corrugated inner tube 122 Corrugated outer tube 123 Space
124 Corrosion protection layer
200 Interconnection section 210 Refrigerant tank 211 Refrigerant branch section 212 Refrigerant coupling section
220 Vacuum tank 221 Vacuum branch section 222 Vacuum coupling section
250 Discrete connection section
300 Single-core connection section

BEST MODE FOR CARRYING OUT THE INVENTION

An embodiment of the invention will be discussed below: To begin with, the general configuration of a line of the invention will be described.

(General Configuration of Line)

FIG. 1 is a schematic configuration drawing of a power cable line of the invention; (A) shows a monopolar power transmission line and (B) shows a bipolar power transmission line. Identical parts are denoted by the same reference numerals in the following accompanying drawings. The line of the invention includes power cables (1g, 1r, 1p, 1m, 1n) for executing DC power transmission and distribution, an AC superposing section 2 for superposing an AC component on the cable, and branch power supply sections 3 for taking out power induced by the superposed AC component from the cable. The monopolar power transmission line and the bipolar power transmission line will be discussed separately.

<Monopolar Power Transmission Line>

In the invention, the monopolar power transmission line includes a power cable 1g as a going line and a power cable 1r as a return line and both the cables 1g and 1r are connected by leads 13 and 14 through an AC/DC converter 11 and a DC/AC converter 12, forming a closed circuit, as shown in FIG. 1 (A). An AC power supply 10a is connected to one end of the cable 1g as the going line and a load is connected to an opposite end of the power cable. The AC/DC converter 11 converts AC of the AC power supply 10a into DC and the DC/AC converter 12 converts transmitted DC into AC. One end of the cable 1r as the return line is grounded. According to the configuration, DC power transmitted from the AC power supply 10a through the AC/DC converter 11 to the going line is supplied to the load through the DC/AC converter 12. As the line of the invention, in such a monopolar power transmission line, an AC superposing section 2 is provided for superposing an AC component on the cable. In the example, the AC superposing section 2 is placed in the proximity of the AC/DC converter 11 in the lead 13. In the example shown in FIG. 1, the AC superposing section 2 is placed on the return line side of the AC/DC converter 11 in the lead 13, but may be placed not only on the going line side of the AC/DC converter 11, but also on the load side (on the lead 14), specifically in a dashed line square A portion in FIG. 1.

The AC superposing section 2 is connected to an AC power supply 10b for superposing an AC component of any desired size on the power cables 1g and 1r. The detailed configuration is described later. The line of the invention includes branch power supply sections 3 on the cables 1g and 1r to draw out the AC component superposed on the cables 1g and 1r. The branch power supply sections 3 used in the example are designed for taking out the AC component by inductive coupling. The detailed configuration is described later.

According to the configuration described above, the line of the invention can easily take out the AC component superposed on the power cable although it executes DC power transmission and distribution. Therefore, the taken-out power can be supplied to various electric power machines used for operation of the line, and an additional independent power supply need not be provided. The taken-out power is supplied to various electric power machines by connecting the branch power supply section 3 and the electric power machines by lead wires, etc.

In the example, the branch power supply section is provided in both the going line and the return line, but may be provided only in one of the lines. To provide the branch power supply section only in the going line, a filter for attenuating the AC component and allowing only a DC component to pass through may be placed to reliably decrease transmission of the superposed AC component to the load. Such a filter may be placed on the load side after conversion to AC by the DC/AC converter 12, specifically in a dashed line circle B portion in FIG. 1 (A) or may be incorporated in the DC/AC converter 12.

The used power cable may use one strand of a single-core cable including first and second superconducting layers (or electrode layers) or may use a multicore cable provided by twisting together two or more cable cores including first and second superconducting layers (or electrode layers). To use the multicore cable, the core not used for power transmission may be used as a spare line. The core used for power transmission constructs a line using the first superconducting layer, the second superconducting layer included in one core. Alternatively, two strands of single-core cables not including the second superconducting layer (or electrode layer) may be used or a multicore cable provided by twisting together two or more cable cores not including the second superconducting layer (or electrode layer) may be used. To use the multicore cable, the number of the cores for a going line and the number of the cores for a return line are set to the same. To use the multicore cable, the core not used for power transmission may be used as a spare line. The cores used for power transmission construct a line using the first superconducting layer of one core and the first superconducting layer of another core. The cable (core) not including the second superconducting layer (or electrode layer) is provided with a ground shield layer as a ground potential for voltage application.

<Bipolar Power Transmission Line>

In the invention, the bipolar power transmission line includes a power cable 1p as a positive pole line, a power cable 1m as a negative pole line, and a power cable in as a neutral line in parallel and the cables 1p and in are connected by leads 13p, 13n, 14p, and 14n through a first AC/DC converter 11p and a first DC/AC converter 12p, and the cables 1m and in are connected by leads 13m, 13n, 14m, and 14n through a second AC/DC converter 11m and a second DC/AC converter 12m, forming a closed circuit, as shown in FIG. 1 (B). An AC power supply 10a is connected to one end of the cable 1p as the positive line and a load is connected to an opposite end of the cable. The first AC/DC converter 11p, the second AC/DC converter 11m converts AC of the AC power supply 10a into DC and the first DC/AC converter 12p, the second DC/AC converter 12m converts transmitted DC into AC. One end of the cable in as the neutral line (in the example, the load side) is grounded. According to the configuration, DC power transmitted from the AC power supply 10a through the AC/DC converter 11p, 11m to the cable 1p, 1m is supplied to the load through the DC/AC converter 12p, 12m. As the line of the invention, in such a bipolar power transmission line, an AC superposing section 2 is provided for superposing an AC component on the power cable 1p, 1n. In the example, the AC superposing section 2 is placed in the proximity of the first AC/DC converter 11p in the lead 13p. In the example shown in FIG. 1, the AC superposing section 2 is placed on the neutral line side of the first AC/DC converter 11p in the lead 13p, but may be placed not only on the positive line side of the first AC/DC converter 11p, the neutral line side of the second AC/DC converter 11m, the negative line side of the second AC/DC converter 11m, the AC power supply 10a side of the cable in, but also on the load side (on the lead 14p, 14n, 14m), specifically in a dashed line square A portion in FIG. 1.

The AC superposing section 2 is connected to an AC power supply 10b for superposing an AC component of an appropriate size on the power cables 1p and in. The detailed configuration of the AC superposing section 2 is described later. The line of the invention includes branch power supply sections 3 on the cables 1p and in to draw out the AC component superposed on the cables 1p and in. The branch power supply sections 3 used in the example are designed for taking out the AC component by inductive coupling, and the detailed configuration is described later.

According to the configuration described above, the line of the invention can easily take out the AC component although it executes DC power transmission and distribution like the monopolar power transmission line. Therefore, the taken-out power can be supplied to various electric power machines used for operation of the line. The taken-out power is supplied to various electric power machines by connecting the branch power supply section 3 and the electric power machines by lead wires, etc.

In the example, the branch power supply section is provided in the positive line and the neutral line, but may be provided at least in one of the positive line, the negative line, and the neutral line; for example, it may be provided only in the positive line, may be provided in both the positive line and the negative line, or may be provided all in the three lines. To provide the branch power supply section in the negative line, the AC superposing section is placed in the lead 13m. To provide the branch power supply section only in the neutral line, the AC superposing section may be provided in any of the lead 13p, 13m, or 13n. To provide the branch power supply section only in the positive line or the negative line, a filter for attenuating the AC component and allowing only a DC component to pass through may be placed to reliably decrease transmission of the superposed AC component to the load. Such a filter may be placed on the load side after conversion to AC by the first DC/AC converter 12p, the load side after conversion to AC by the second DC/AC converter 12m, specifically in a dashed line circle B portion in FIG. 1 (B) or may be incorporated in the second DC/AC converter 12p, 12m. Further, in the example, only one end of the neutral line is grounded, but both ends may be grounded.

The used power cable may use two strands of single-core cables including first and second superconducting layers (or electrode layers) or may use a two-core cable provided by twisting together two cable cores including first and second superconducting layers (or electrode layers). A multicore cable including three or more cores may be used and the core not used for power transmission may be provided as a spare line. The cores used for power transmission construct a line using the first superconducting layer, the second superconducting layer included in two cores. Alternatively, three strands of single-core cables not including the second superconducting layer (or electrode layer) may be used or a multicore cable provided by twisting together three or more cable cores not including the second superconducting layer (or electrode layer) may be used. To use single-core cables of three strands or more or the multicore cable of three or more cores, the core not used for power transmission may be used as a spare line. The cores used for power transmission construct a line using the first superconducting layer of one core, the first superconducting layer of another core, and the first superconducting layer of still another core. The cable (core) not including the second superconducting layer (or electrode layer) is provided with a ground shield layer as a ground potential for voltage application.

<AC Superposing Section>

Figure 2:
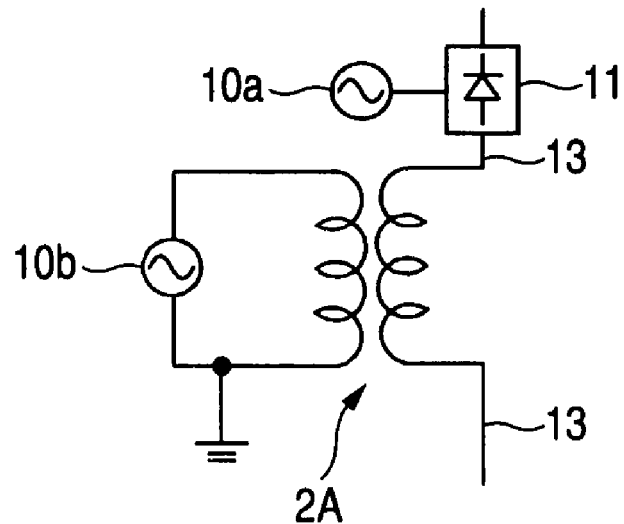
FIGS. 2(A) and 2(B) are schematic configuration drawings of an AC superposing section included in the line of the invention with FIG. 2(A) showing the configuration including a transformation section and FIG. 2(B) showing the configuration including an inductive coupling section.
Figure 2:
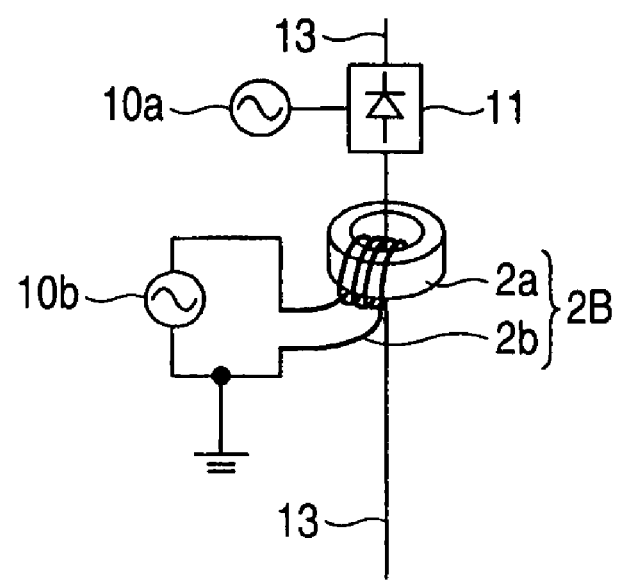

FIG. 2 is a schematic configuration drawing of an AC superposing section included in the line of the invention; (A) shows the configuration including a transformation section and (B) shows the configuration including an inductive coupling section. An AC superposing section 2A shown in FIG. 2(A) includes a transformation section connected to an AC power supply 10b for transforming AC power. Power from the AC power supply 10b is changed to an appropriate amount by the transformation section and an AC component is superposed on a lead 13. According to the configuration, the AC component is allowed to flow into the power cable (see FIG. 1) through the lead 13 and a DC component is allowed to flow by an AC/DC converter 11.

An AC superposing section 2B shown in FIG. 2 (B) includes a ferromagnetic body 2a placed in the outer periphery of a lead 13 and a winding 2b wound spirally around the outer periphery of the ferromagnetic body 2a and connected to an AC power supply 10b for allowing AC power to flow into the winding. In the example, a body made of a ferrite core shaped like a ring using a pair of semicircular arc pieces in combination so as to be easily placed in the outer periphery of the lead 13 was used as the ferromagnetic body 2a. The winding 2b used an electrically conductive material. In the AC superposing section 2B, an AC current flows into the winding 2b from the AC power supply 10, whereby a magnetic field is applied to the ferromagnetic body 2a and an AC current flows into the lead 13 in response to the magnetic permeability of the magnetic field and the ferromagnetic body 2a. According to the configuration, the AC component is allowed to flow through the lead 13 into the power cable (see FIG. 1) and a DC component is allowed to flow by an AC/DC converter 11. The AC superposing section based on inductive coupling is preferred particularly when a superconducting cable capable of transmitting large-capacity DC power is used as the line. The power superposed by the AC superposing section is set to DC power to be transmitted or less so as not to impair DC transmission and distribution.

(Branch Power Supply Section)

A normal conducting cable or a superconducting cable can be used as the power cable used for the line of the invention. Particularly, the configuration and the placement state of the branch power supply section when a superconducting cable is used will be discussed.

<Superconducting Cable>

Figure 3:
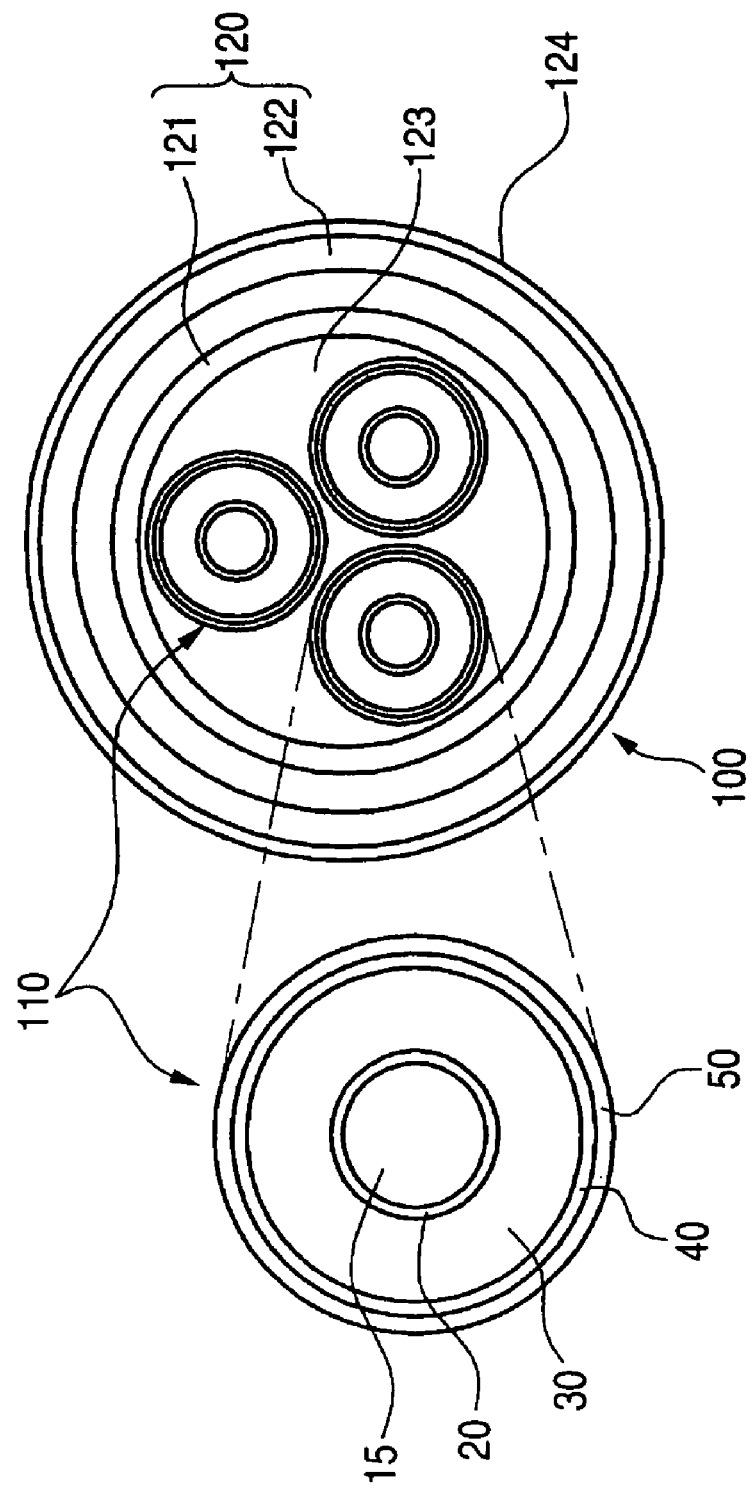
FIG. 3 is a sectional view of a superconducting cable of three-core package type.

First, before the description of the branch power supply section, the configuration of a superconducting cable used for the line will be discussed. FIG. 3 is a sectional view of a superconducting cable of three-core package type. A cable 100 is a cable of low temperature insulating type and has three cable cores 110 housed in a heat insulation tube 120. Each core 110 has a former 15, a first superconducting layer 20, an electrical insulating layer 30, a second superconducting layer 40, and a protective layer 50 in order from the center. A superconducting wire is used for the first superconducting layer 20 and the second superconducting layer 40. In such a superconducting cable, the first superconducting layer of one core is used as a positive line, the first superconducting layer of another core is used as a negative line, and the second superconducting layers of these two cores are used as neutral line, whereby bipolar power transmission can be conducted. The remaining core may be used as a spare line. The first superconducting layer of each core is used as a going line and the second superconducting layer of the same core is used as a return line, whereby monopolar power transmission can be conducted.

<<Former>>

The former 15 can use a solid substance provided by twisting together metal wires or a hollow substance using a metal pipe. As an example of the solid former, a substance provided by twisting together copper element wires can be used. To use a hollow former, the inside of the former can be used as a flow passage of a refrigerant.

<<First Superconducting Layer>>

A tape wire having a plurality of oxide high-temperature superconducting filaments coated with a silver sheath is suitable for the first superconducting layer 20. Here, a Bi2223-based tape wire was used. The tape wire is wound around the former as multiple layers to form the first superconducting layer 20.

<<Electrical Insulating Layer>>

The electrical insulating layer 30 is formed on the first superconducting layer 20. The electrical insulating layer 30 can be formed by winding piling kraft paper and a resin film of polypropylene, etc., on each other (PPLP: Registered trademark, manufactured by Sumitomo Denkikougyou Kabushikikaisha), etc., for example, around the outer periphery of the first superconducting layer 20.

<<Second Superconducting Layer>>

The superconducting cable used in the example is provided with the second superconducting layer 40 coaxially with the first superconducting layer 20 on the outside of the electrical insulating layer 30. The second superconducting layer 40 is formed by winding a superconducting wire similar to that used for the first superconducting layer 20 around the outside of the electrical insulating layer 30. The second superconducting layer 40 is used as a return line for monopolar power transmission or is used as a neutral line for bipolar power transmission.

<<Protective Layer>>

Further, the protective layer 50 is formed on the second superconducting layer 40. The protective layer 50 mechanically protects the internal structure from the second superconducting layer 40 to the former and is formed by winding kraft paper or cloth tape around the second superconducting layer 40.

<<Heat Insulation Tube>>

The heat insulation tube 120 has a double-tube structure of a stainless corrugated inner tube 121 and a stainless corrugated outer tube 122. Usually, a space is formed between the corrugated inner tube 121 and the corrugated outer tube 122 and is evacuated. Superinsulation (trade name) is placed in the evacuated space for reflecting radiation heat. In the corrugated inner tube 121, a refrigerant of liquid nitrogen, etc., is filled into a space 123 surrounded by the inner peripheral surface of the inner tube 121 and the outer peripheral surfaces of the cable cores 110, thereby cooling the first superconducting layer 20 and the second superconducting layer 40 to maintain a superconducting state. Using liquid nitrogen as a refrigerant also serves as an electrical insulator for the layers. A corrosion protection layer 124 formed of polyvinyl chloride is formed on the corrugated outer tube 122.

The configuration including the branch power supply section for drawing out branch power as a power source of various electric power machines used for operation of the line in an interconnection section of the superconducting cable described above will be discussed based on FIG. 4.

FIRST EXAMPLE OF BRANCH POWER SUPPLY SECTION

Figure 4:
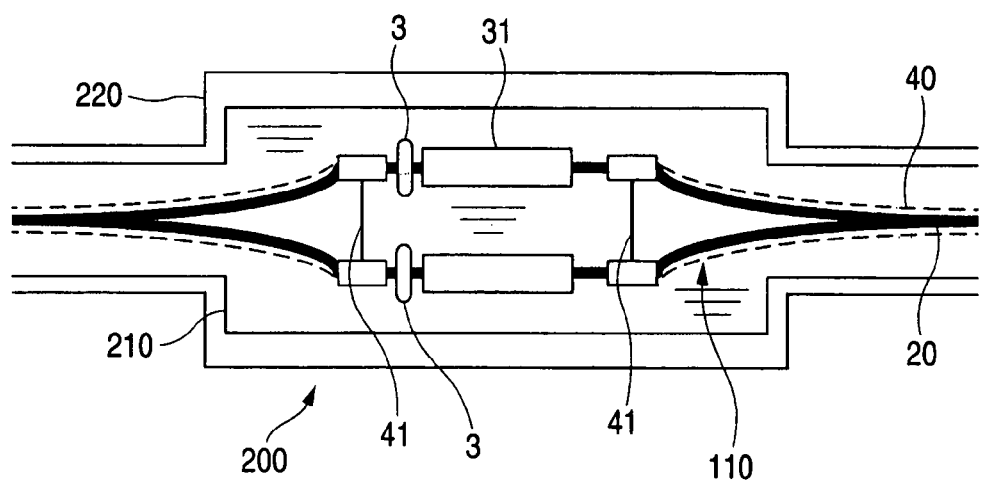
FIG. 4 is a schematic drawing to show the schematic configuration including branch power supply sections in an interconnection section of three-core superconducting cables and shows a configuration wherein three cores are housed in a single refrigerant tank and a single vacuum tank and a short circuit section connecting second superconducting layers of the cores constructing different lines is included.

FIG. 4 is a schematic drawing to show the schematic configuration of the interconnection section of the superconducting cable. It shows only two cores for convenience of the description; in fact, however, three cores exist. In the cable core 110 in FIG. 4, the thick solid line indicates the first superconducting layer of each core and the dashed line indicates the second superconducting layer. The part where the thick solid line and the dashed line are shown in parallel is a part where actually the second superconducting layer is placed coaxially on the outside of the first superconducting layer through the electrical insulating layer. Similar comments apply to the connection section shown in each figure on and after FIG. 5 described later.

An interconnection section 200 shown in FIG. 4 has a configuration wherein ends of a pair of superconducting cables are abutted against each other and the three cores 110 forming one cable are abutted against those forming the other for connection. To form the connection section 200, with the ends of the cores 110 abutted against each other, step stripping is previously performed so that the ends of the first superconducting layers 20, the electrical insulating layers, and the second superconducting layers 40 are exposed. The first superconducting layers 20 of the abutted cores 110 are connected to form a conductor connection section. To abut the cores 110, the cores of the superconducting cables for constructing the same line are abutted against each other. For example, the core used as a positive line in one superconducting cable and the core used as a positive line in the other superconducting cable are abutted against each other. An insulating coat section 31 is formed by winding insulating paper, etc., around the outside of the conductor connection section.

At the ends of the second superconducting layers 40, the second superconducting layers 40 of the cores constructing different lines are short-circuited by a short circuit section 41. This means that the second superconducting layers 40 of the cores of different lines are connected by the short circuit section 41 on each of the right and the left with the insulating coat section 31 between, forming a closed circuit. If a braided wire material excellent in flexibility is used, the second superconducting layers 40 are easily connected and connection workability is excellent.

The ends of the cores 110, the insulating coat sections 31, and the short circuit sections 41 are housed in a refrigerant tank 210. In the refrigerant tank 210, a refrigerant of liquid nitrogen, etc., is distributed for cooling the superconducting wires used for the connection section at an extremely low temperature to maintain them in the superconducting state. A vacuum tank 220 is placed on the outside of the refrigerant tank 210 for heat insulation.

In the connection section 200, a part where the electrical insulating layer is exposed, not covered with the second superconducting layer 40 exists between the insulating coat section 31 and the end of the superconducting layers 40. The part is used as a separation part and the branch power supply section 3 is provided in the outer periphery of the separation part. In this case, the AC superposing section superposes an AC component on the first superconducting layer 20.

In the example, a device for taking out AC power by inductive coupling is used as the branch power supply section 3. Specifically, it includes a ferromagnetic body placed in the outer periphery of the separation part and a winding (not shown) wound spirally around the outer periphery of the ferromagnetic body. FIG. 4 shows a state in which the annular ferromagnetic body is viewed along the diametrical direction from the outer periphery side. In the example, a body made of a ferrite core shaped like a ring using a pair of semicircular arc pieces in combination so as to be easily placed in the outer periphery of the separation part was used as the ferromagnetic body. An electrically conductive material was used as the winding. In the example, the branch power supply sections 3 are placed in a state in which they are immersed in the refrigerant. Using a magnetic field produced by AC current flowing through the first superconducting layer 20 of the separation part, an induced current is caused to occur in the winding of the branch power supply section 3 and is drawn out through a lead wire not shown. The lead wire passes through the refrigerant tank 210 and the vacuum tank 220 and is drawn out to the outside of the connection section. At this time, the passage parts of the refrigerant tank 210 and the vacuum tank 220 are sealed with a hermetic seal.

The end of the lead wire is connected to any of various electric power machines required for operation of the superconducting cable, for example, a sensor and a monitoring device and other machines such as an auxiliary refrigerator and an auxiliary pump. According to the components, the electric power machines can be driven using AC power drawn out by the branch power supply sections.

In FIG. 4, the part where the second superconducting layer 40 is removed and the electrical insulating layer is exposed is used as a separation part and the branch power supply section 3 is placed in the separation part. However, as another separation part, for example, the short circuit section 41 of the second superconducting layer 40 can also be used. Since the short circuit section 41 is a part where the second superconducting layer 40 is separated from the first superconducting layer 20 and is disposed non-coaxially, magnetic fields produced by currents flowing through both layers 20 and 40 do not cancel each other and power can be drawn out by the branch power supply section 3. In this case, the AC superposing section superposes an AC component on the second superconducting layer 40 (return conductor or neutral line). In FIG. 4, the branch power supply sections are placed in a plurality of parts that can be used as separation parts, but any one may be selected and the branch power supply section may be placed therein. Similar comments apply to the description on and after FIG. 5.

In the example, the superconducting cable having the second superconducting layer has been described, but a superconducting cable having no second superconducting layer (however, having a ground shield layer as a ground potential) may be used. For example, in bipolar power transmission, the first superconducting layer of one core may be used as a positive line, the first superconducting layer of another core may be used as a negative line, and the first superconducting layer of still another core may be used as a neutral line, and an AC component may be superposed on the first superconducting layer of at least one core. At this time, the branch power supply section can be provided in any desired part of the core. Likewise, in monopolar power transmission, the first superconducting layer of one core may be used as a going line, the first superconducting layer of another core may be used as a return line, and still another core may be used as a spare line, and an AC component may be superposed on the first superconducting layer of at least one of the cores used as the going line and the return line. Similar comments apply to the description on and after FIG. 5.

SECOND EXAMPLE OF BRANCH POWER SUPPLY SECTION

Figure 5:
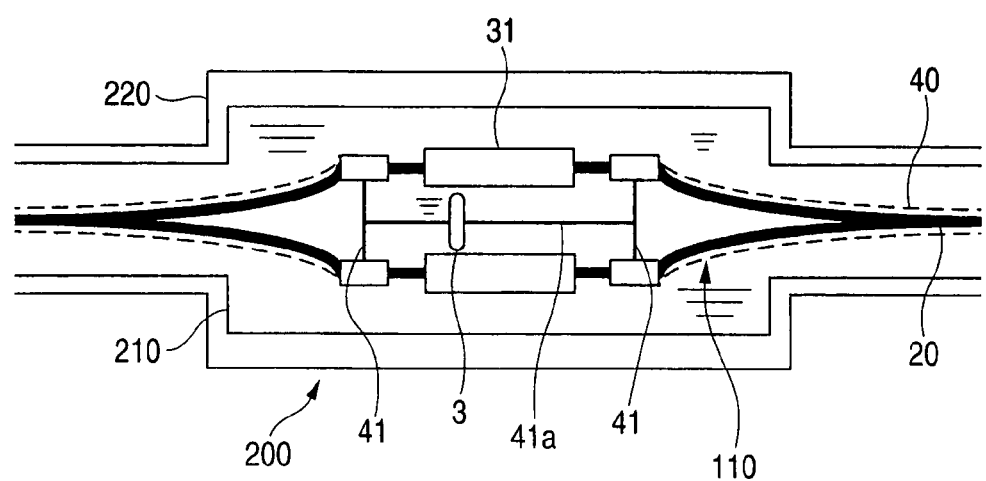
FIG. 5 shows a configuration wherein a short circuit connection section for connecting short circuit sections is included in the interconnection section of the three-core superconducting cables shown in FIG. 4.

The first example described above shows the configuration wherein the short circuit sections 41 connecting the second superconducting layers of the cores constructing different lines are included. Further, the short circuit sections 41 may be connected and a branch power supply section 3 may be placed in a short circuit connection section 41a as shown in FIG. 5. Like the short circuit sections 41, the short circuit connection section 41a is separated from the first superconducting layer 20 and is placed non-coaxially and thus the branch power supply section 3 is placed in the connection section 41a, so that power can be branched and taken out by induction from the magnetic field of an AC current flowing through the connection section 41a. Such a short circuit connection section 41a can also be provided in examples shown in FIG. 6 and the later figures.

THIRD EXAMPLE OF BRANCH POWER SUPPLY SECTION

The first example described above shows the configuration wherein the short circuit sections connecting the second superconducting layers of the cores constructing different lines are included. In a third example, the case where the short circuit section is not included and branch power supply sections are included in an interconnection section connecting second superconducting layers of the cores constructing the same line to each other in parallel with first superconducting layers will be discussed based on FIG. 6.

Figure 6:
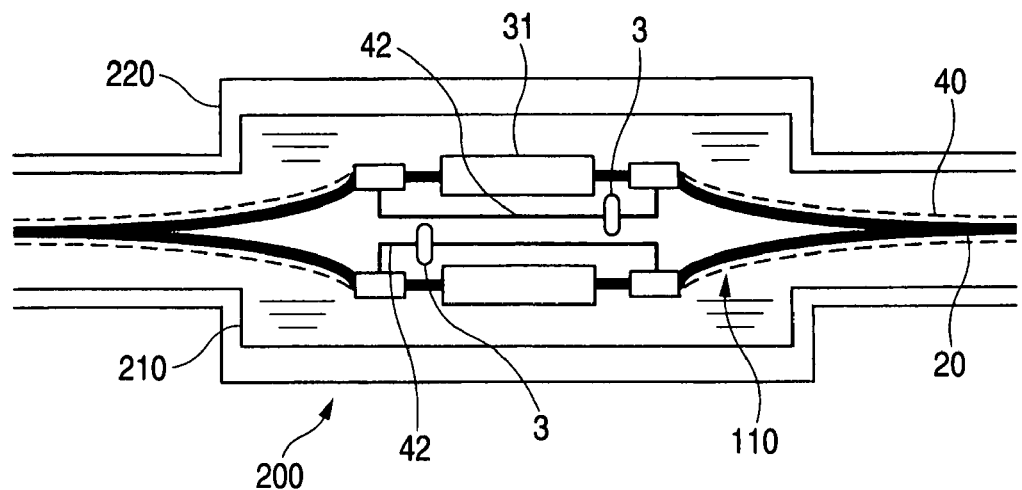
FIG. 6 is a schematic drawing to show the schematic configuration including branch power supply sections in an interconnection section of three-core superconducting cables and shows a configuration wherein three cores are housed in a single refrigerant tank and a single vacuum tank and a coupling section connecting second superconducting layers of the cores constructing the same line is included.

The connection section shown in FIG. 6 is the same as that in the first example in that layers are step-stripped at ends of a pair of superconducting cables, conductor connection sections and insulating coat sections 31 are formed, and a refrigerant tank 210 and a vacuum tank 220 cover connection parts collectively. The third and first examples differ in that second superconducting layers 40 of cores 110 constructing the same line are connected in a coupling section 42 without short circuiting second superconducting layers 40 of cores 110 constructing different lines and that a branch power supply section 3 is provided in the coupling section 42. The configuration of the branch power supply section 3 is similar to that in the first example and the branch power supply section 3 is immersed in a refrigerant as in the first example.

Since the second superconducting layer 40 is not disposed coaxially with first superconducting layer 20, the branch power supply section 3 is placed in the coupling section 42 shown in the example, so that power can be branched and taken out by induction from the magnetic field of an AC current flowing through the coupling section 42.

FOURTH EXAMPLE OF BRANCH POWER SUPPLY SECTION

Next, the case where branch power supply sections are included in an interconnection section having a refrigerant tank branched for each core and a vacuum tank for covering the branch parts of the refrigerant tanks collectively will be discussed based on FIG. 7.

In the interconnection section of the superconducting cables shown in each of the first to third examples, a branch connection structure is formed for each core 110 and the three connection parts are housed in the single refrigerant tank. In contrast, the interconnection section shown in a fourth example differs in that a refrigerant tank 210 is also branched for each core 110. That is, a conductor connection section and an insulating coat section 31 are formed at the end of each core 110 as in the first example and second superconducting layers 40 are short-circuited by a short circuit section 41 between the cores constructing different lines. A separation part where first superconducting layer 20 and the second superconducting layer 40 are disposed non-coaxially is formed between the short circuit section 41 and the insulating coat section 31. On the other hand, the refrigerant tank 210 is branched for each core to form refrigerant branch sections 211 and the insulating coat section 31 and the separation part are housed in each of the refrigerant branch sections 211. The refrigerant branch section 211 is formed using a member that can be divided into two left and right pieces at an almost midway point. In the example, the refrigerant tank 210 is housed in one vacuum tank 220 as in the first example. That is, the vacuum tank 220 is not branched and uses a cylindrical vessel that can house the refrigerant branch sections 211 of the refrigerant tank 210 collectively.

Figure 7:
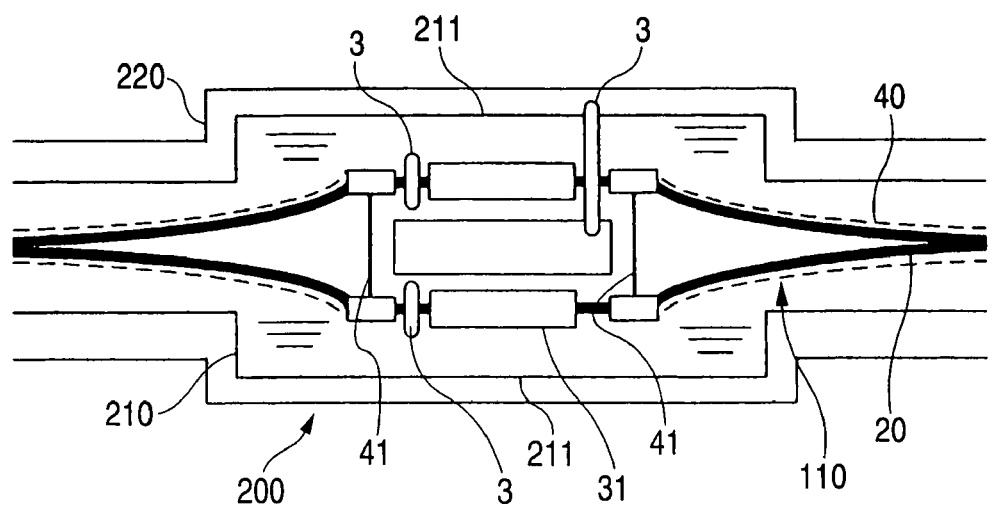
FIG. 7 is a schematic drawing to show the schematic configuration including branch power supply sections in an interconnection section of three-core superconducting cables and shows a configuration wherein a refrigerant tank is branched for each core and a vacuum tank for covering the branch parts of the refrigerant tanks collectively is included.

In the connection section shown in FIG. 7, a branch power supply section 3 is provided in the outer periphery of the separation part. The configuration of the branch power supply section 3 is similar to that in the first example. The branch power supply section 3 may be provided in the separation part in the refrigerant branch section 211 or may be provided in the separation part in the vacuum tank 220 outside the refrigerant branch section 211. In the latter case, a lead wire connected to the branch power supply section 3 need not penetrate the refrigerant tank 210 and needs only to penetrate the vacuum tank 220. The branch power supply section 3 may be placed in the outer periphery of the short circuit section 41 or may be placed in the outer periphery of a coupling section provided without providing any short circuit section as in the third example. The branch power supply section 3 is provided in such a separation part, whereby branch power can be taken out from the connection section.

FIFTH EXAMPLE OF BRANCH POWER SUPPLY SECTION

Next, the case where branch power supply sections are included in an interconnection section wherein not only a refrigerant tank, but also a vacuum tank is branched for each core will be discussed based on FIG. 8.

In the fourth example described above, the connection section wherein the refrigerant tank 210 is formed with the refrigerant branch sections 211 and the vacuum tank 220 is not branched is used. In a fifth example, a vacuum tank 220 is also branched for each core 110. This means that the vacuum tank 220 is formed with vacuum branch sections 221 provided in a one-to-one correspondence with refrigerant branch sections 211 so as to be able to cover the refrigerant branch sections 211 of a refrigerant tank 210 individually. Like the refrigerant branch section 211, the vacuum branch section 221 is formed using a member that can be divided into two left and right pieces at an almost midway point. The configuration of the interconnection section is similar to that in the fourth example described above except that the vacuum tank 220 is also branched for each core 110, and an insulating coat section 31 and a separation part are housed in each of the refrigerant branch sections 211.

Figure 8:
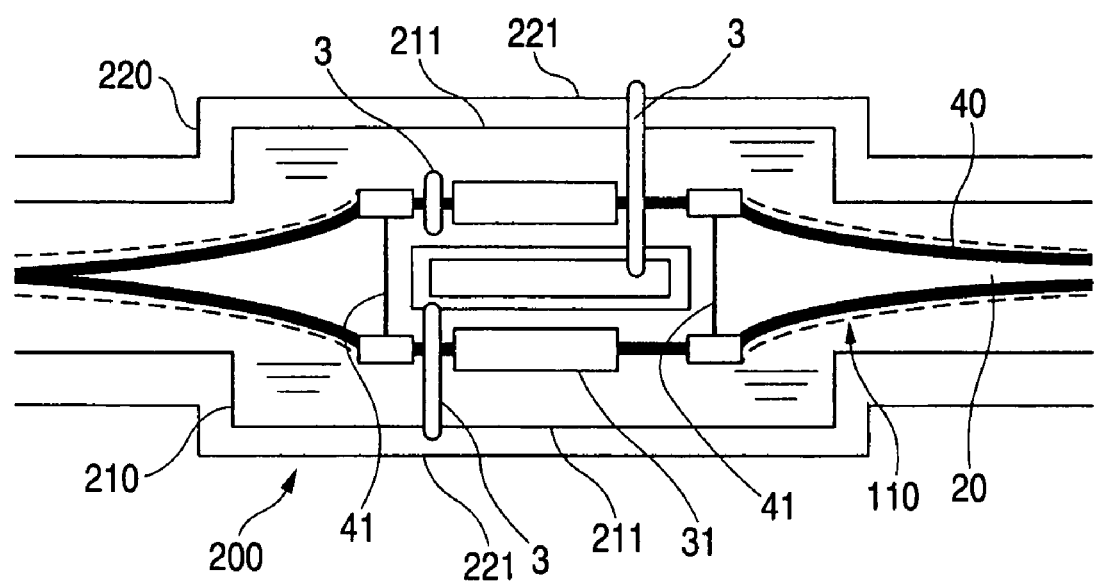
FIG. 8 is a schematic drawing to show the schematic configuration including branch power supply sections in an interconnection section of three-core superconducting cables and shows a configuration wherein a refrigerant tank and a vacuum tank are branched for each core.

In the interconnection section shown in FIG. 8, it is possible to provide a branch power supply section 3 not only in a separation part inside the refrigerant branch section 211 or a separation part inside the vacuum branch section 221 outside the refrigerant branch section 211, but also in a separation part outside the vacuum branch section 221. To include the branch power supply section 3 in the separation part outside the vacuum branch section 211, a lead wire connected to the branch power supply section 3 need not penetrate the refrigerant tank 210 or the vacuum tank 220. The branch power supply section 3 may be placed in the outer periphery of a short circuit section 41 or may be placed in the outer periphery of a coupling section provided without providing any short circuit section as in the third example. The branch power supply section 3 is provided in such a separation part, whereby branch power can be taken out from the connection section as in the first to third examples.

SIXTH EXAMPLE OF BRANCH POWER SUPPLY SECTION

Figure 9:
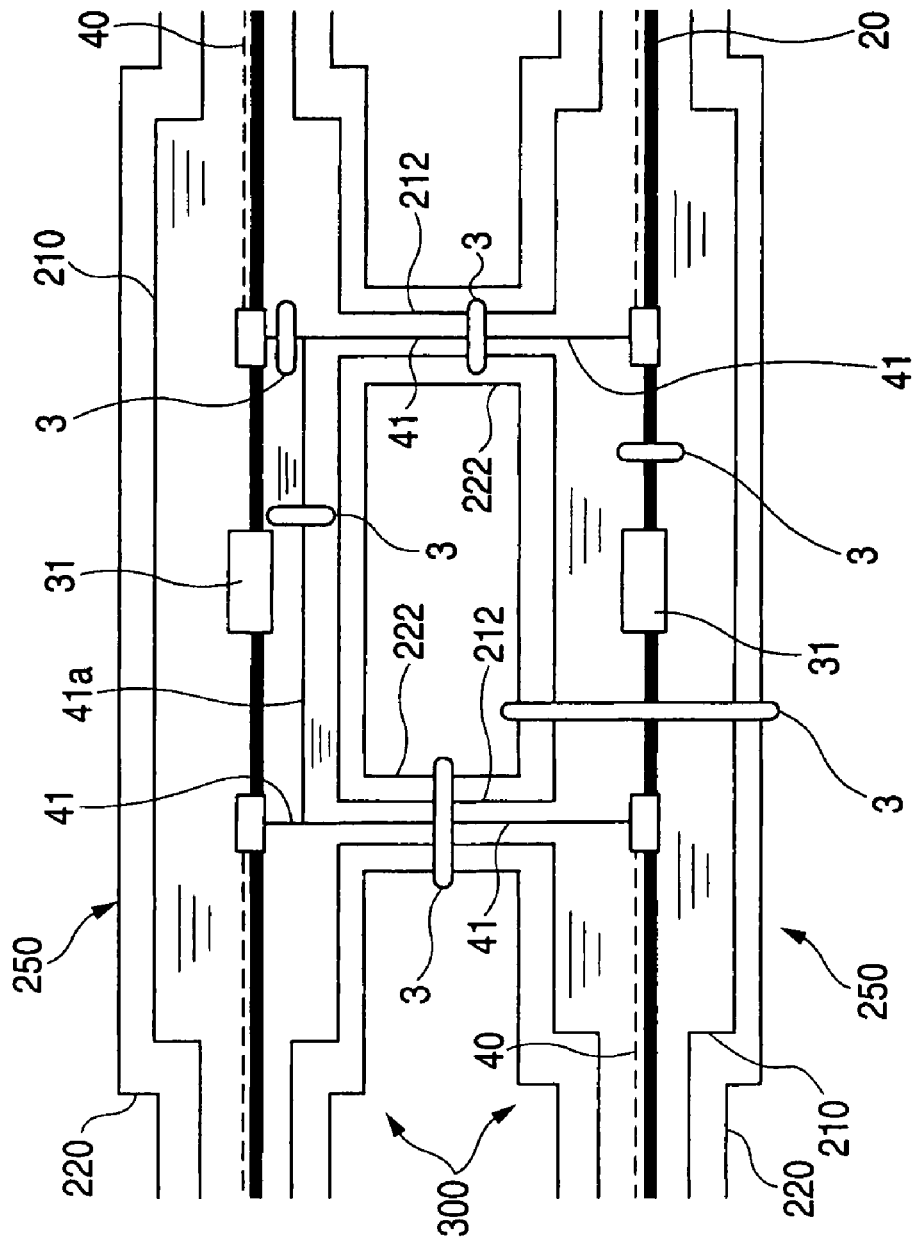
FIG. 9 is a schematic drawing to show the schematic configuration including branch power supply sections in an interconnection section of single-core superconducting cables.
Figure 11:
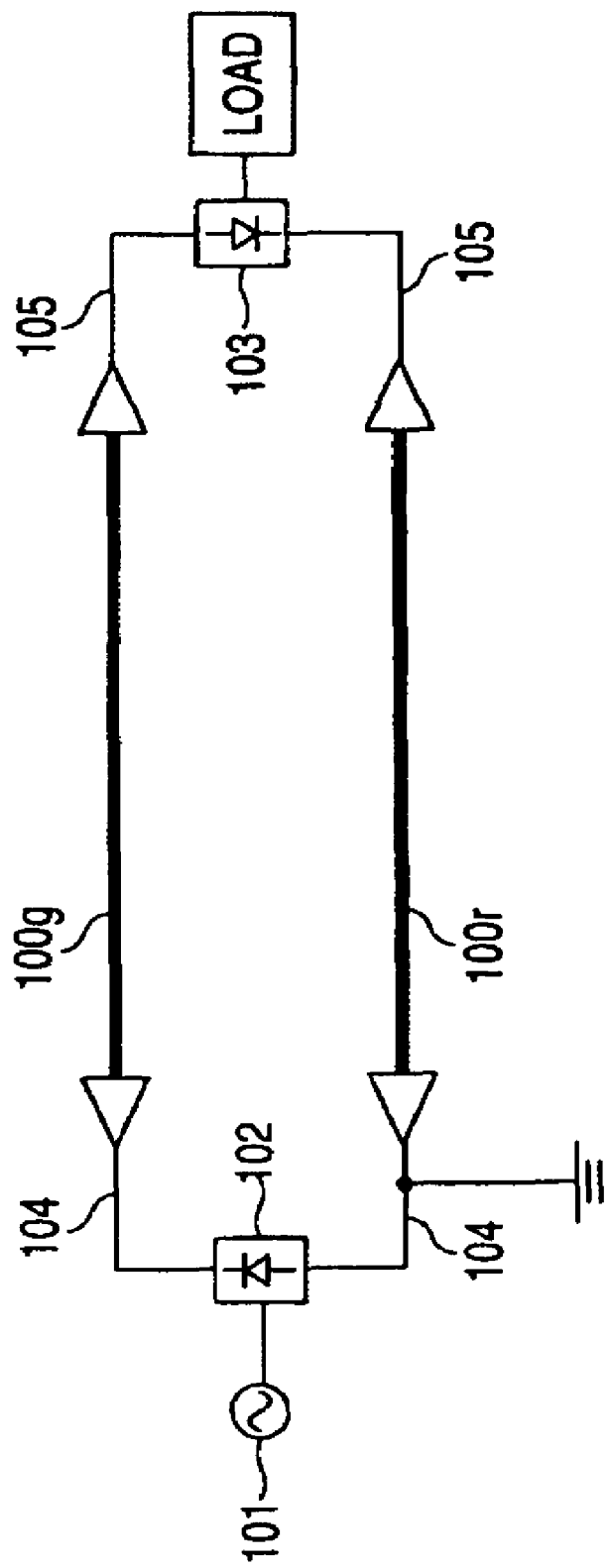
FIG. 11(A) is a schematic configuration drawing of a monopolar power transmission line and FIG. 11(B) is a schematic configuration drawing of a bipolar power transmission line.

In the first to fifth examples, the configuration wherein the branch power supply sections are included in the interconnection section of a multicore superconducting cable and branch power is taken out has been described. In a sixth example, a configuration wherein branch power is drawn out from an interconnection section of a single-core superconducting cable will be discussed based on FIG. 9. The single-core superconducting cable has a configuration wherein the cores of the above-mentioned three-core superconducting cable become one core. One strand of such a single-core superconducting cable is included (two strands if a second superconducting layer is not contained), whereby a monopolar power transmission line can be constructed. Two strands of such single-core superconducting cables are included (three strands if a second superconducting layer is not contained), whereby a bipolar power transmission line can be constructed. In the example, the case where a monopolar power transmission line is constructed using one strand of a single-core superconducting cable having a second superconducting layer will be discussed. That is, in each single-core superconducting cable, the first superconducting layer is used as a going line and the second superconducting layer is used as a return line.

In the example, two single-core superconducting cables 300 are placed in parallel and each cable 300 is formed with a discrete connection section 250. In the discrete connection section 250, a conductor connection section is formed as in the first example at the end of the superconducting cable 300 and an insulating coat section 31 is provided on the conductor connection section. The discrete connection section 250 is housed in a refrigerant tank 210 and is immersed in a refrigerant of liquid nitrogen, etc. A vacuum tank 220 covers the outside of the refrigerant tank 210 for heat insulation.

In the example, a short circuit section 41 for short circuiting second superconducting layers 40 of the superconducting cables 300 is formed between the adjacent discrete connection sections 250. In the example, the short circuit section 41 is formed on each of the right side and the left side of the conductor connection section which is provided with the insulating coat section 31; the second superconducting layers 40 of the adjacent discrete connection sections 250 positioned on the right of the insulating coat sections 31 are connected by the short circuit section 41 to form a closed circuit and likewise the second superconducting layers 40 of the adjacent discrete connection sections 250 positioned on the left of the insulating coat sections 31 are connected by the short circuit section 41 to form a closed circuit. The short circuit sections 41 are covered with refrigerant coupling sections 212 and vacuum coupling sections 222 for coupling the adjacent refrigerant tanks 210 and the adjacent vacuum tanks 220 and are immersed in a refrigerant of liquid nitrogen, etc.

With the short circuit section 41 as a separation part, a branch power supply section 3 is provided in the outer periphery of the short circuit section 41. More specifically, the inside of the refrigerant tank 210 in the short circuit section 41, the inside of the vacuum coupling section 222 outside the refrigerant coupling section 212 in the short circuit section 41, and the outside of the vacuum coupling section 222 in the short circuit section 41 can be used. As other separation parts, a part between the insulating coat section 31 and the short circuit section 41 in the refrigerant tank 210 other than the refrigerant coupling section 212, a part between the insulating coat section 31 and the short circuit section 41 outside the vacuum tank 220 other than the vacuum coupling section 222, a short circuit connection section 41a if the short circuit connection section 41a is provided, or the like can be used. As shown in the example, branch power can also be taken out from the connection section of the superconducting cables 300.

SEVENTH EXAMPLE OF BRANCH POWER SUPPLY SECTION

In the first to six examples, the configuration of taking out branch power in the superconducting cable has been described. In a seventh example, a configuration of taking out branch power from an interconnection section of normal conducting cables will be discussed based on FIG. 10. A normal conducting cable 60 includes a sheath 61 in the outer periphery of a cable core having a conductor, an electrical insulating layer, and an electrode layer coaxially in order from the center. As an interconnection structure for connecting the cables 60, the electrode layer and the electrical insulating layer are step-stripped at each sheath 61 end to expose the conductor, the conductors are connected to each other using a connection member of a connection sleeve, etc., a supplementary insulating layer is provided so as to cover the conductor connection part and the ends of the step-stripped layers, and a connection case 62 is placed in the outer periphery of the supplementary insulating layer. The connection case 62 is provided by combining split pieces that can be split in the length direction and a joint section 64 of the split pieces is formed of an insulating material. The sheaths 61 of the cables 60 are electrically connected to the connection case 62. Then, the split pieces of the connection case 62 are coupled by a connection line 63 and a branch power supply section 3 is placed in the connection line 63 as shown in FIG. 10(A). The connection line 63 is a branch part disposed non-coaxially with the conductor and power can be drawn out by the branch power supply section 3. Alternatively, the branch power supply section 3 may be placed in the outer periphery of the joint section 64 as shown in FIG. 10(B). In the joint section 64, the electrode layer of the sheath 61 and the connection case 62 electrically connected to the electrode layer of the sheath 61 do not exist in the outer periphery of the conductor, so that power can be drawn out by the branch power supply section 3.

While the invention has been described in detail with reference to the specific embodiment, it will be obvious to those skilled in the art that various changes and modifications can be made without departing from the spirit and the scope of the invention.

This application is based on Japanese Patent Application (No. 2004-349164) filed on Dec. 1, 2004, which is incorporated herein by reference.

INDUSTRIAL APPLICABILITY

The power cable line of the invention can be used to supply power and enables an additionally superposed AC component to be taken out for use to drive an electric power machine to operate the line although it is a DC power transmission line.

The invention claimed is:

1. A power cable line, comprising:
    a power cable configured to execute DC transmission and distribution;
    an AC superposing section configured to superpose an AC component on the power cable; and
    a branch power supply section configured to take out the AC component superposed by the AC superposing section from the cable,
    wherein the power cable is a superconducting cable, and
    wherein the superconducting cable has a first superconducting layer and a second superconducting layer with an electric insulating layer between the first superconducting layer and the second superconducting layer, wherein sections of the first and second superconducting layers are provided coaxially, and wherein the branch power supply section is provided in a separation part where connection sections of the first superconducting layer and the second superconducting layer are not provided coaxially.

2. The power cable line as claimed in claim 1, wherein the superconducting cable includes a cable core comprising a former, the first superconducting layer, the second superconducting layer and the electric insulating layer, housed in a heat insulation tube cooled by a refrigerant.

3. The power cable line as claimed in claim 1 wherein the AC component is superposed on the first superconducting layer.

4. The power cable line as claimed in claim 1, wherein the AC component is superposed on the second superconducting layer.

5. A power cable line, comprising:
    a superconducting power cable configured to transmit and distribute DC electric power;
    an AC superposing section configured to superpose an AC component on the power cable; and
    a branch power supply section configured to take the AC component out from the cable; and
    wherein the cable includes coaxially positioned first and second superconducting layers and an electric insulating layer located between the first and second superconducting layers; and
    wherein the cable includes a connection section configured for connecting the cable to another cable, and wherein the connection section includes a separation part of the cable where the first superconducting layer and the second superconducting layer are not provided coaxially and wherein the branch power supply section is provided in the separation section.

6. The power cable line as claimed in claim 5, wherein the power cable line comprises a filter electrically coupled to a load using power transmitted over the line, the filter configured to decrease the flow of the superposed AC component into the load.

7. The power cable line as claimed in claim 5, wherein the branch power supply section takes out the AC component superposed by the AC superposing section using induced coupling.

8. The power cable line as claimed in claim 5, wherein the power cable is a solid cable.

9. The power cable line as claimed in claim 5, wherein the power cable includes a cable core having a conductor and an electric insulating layer placed on an outer periphery of the conductor.

10. The power cable line as claimed in claim 9, wherein the power cable further includes a metal sheath placed on an outer periphery of the cable core.

11. The power cable line as claimed in claim 5, wherein the power cable includes a plurality of cores.

12. The power cable line as claimed in claim 5, further comprising an AC/DC converter configured to supply DC current to the power cable line from an AC power supply.

13. The power cable line as claimed in claim 12, wherein the AC superposing section is electrically coupled to the AC/DC converter.

14. The power cable line as claimed in claim 12, further comprising a DC/AC converter configured to convert the supplied DC current into AC current.

\* \* \* \* \*